(12) United States Patent
Kubota et al.

(10) Patent No.: US 7,320,608 B2
(45) Date of Patent: Jan. 22, 2008

(54) ELECTRIC DISTRIBUTION BOX AND METHOD OF ASSEMBLING THE SAME

(75) Inventors: Katsuhiro Kubota, Ogasa-gun (JP); Keisuke Ozawa, Ogasa-gun (JP); Masahiro Wada, Ogasa-gun (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/315,143

(22) Filed: Dec. 23, 2005

(65) Prior Publication Data

US 2006/0141824 A1    Jun. 29, 2006

(30) Foreign Application Priority Data

Dec. 24, 2004   (JP)   ............... P2004-374723

(51) Int. Cl.
*H01R 12/00* (2006.01)
(52) U.S. Cl. ............... 439/76.1; 439/621; 439/949
(58) Field of Classification Search ............ 439/76.2, 439/621, 79, 949
See application file for complete search history.

(56) References Cited

U.S. PATENT DOCUMENTS

| 4,689,718 | A | * | 8/1987 | Maue et al. | ............ | 361/686 |
| 6,116,916 | A | * | 9/2000 | Kasai | ............ | 439/76.2 |
| 6,430,054 | B1 | * | 8/2002 | Iwata | ............ | 361/752 |
| 6,796,808 | B2 | * | 9/2004 | Hosoe et al. | ............ | 439/76.2 |
| 6,824,398 | B2 | * | 11/2004 | Hara | ............ | 439/76.2 |
| 6,870,096 | B2 | * | 3/2005 | Suzuki et al. | ............ | 174/50 |
| 6,905,348 | B2 | * | 6/2005 | Naitou et al. | ............ | 439/76.2 |
| 6,984,133 | B2 | * | 1/2006 | Naitou et al. | ............ | 439/76.2 |
| 2002/0151197 | A1 | * | 10/2002 | Kawakita et al. | ............ | 439/76.2 |
| 2004/0051399 | A1 |   | 3/2004 | Hara | | |

FOREIGN PATENT DOCUMENTS

| EP | 1 487 054 A1 | 12/2004 |
| EP | 1 530 411 A1 | 5/2005 |
| JP | 11-27829 A | 1/1999 |
| WO | 2005/013449 A1 | 2/2005 |

* cited by examiner

*Primary Examiner*—Hien Vu
(74) *Attorney, Agent, or Firm*—Sughrue Mion Pllc.

(57) ABSTRACT

An electric distribution box includes a printed circuit board that has a distribution installation circuit, a fuse holder that has a plurality of first connection terminals for connecting the distribution installation circuit, a connector block that has a plurality of second connection terminals for connecting the distribution installation circuit, and a power bus bar. The fuse holder is attached to a first end portion of the printed circuit board. The connector block is attached to a second end portion of the printed circuit board. The power bus bar is attached to the printed circuit board so as to face an attached face of the print circuit board in which the fuse holder and the connector block are attached.

8 Claims, 9 Drawing Sheets

ELECTRIC DISTRIBUTION BOX AND METHOD OF ASSEMBLING THE SAME

BACKGROUND OF THE INVENTION

This invention relates to an electric distribution box for connecting and distributing a power circuit collectively to a load circuit such as a controller via relays and a method of assembling the same.

One known related electric distribution box includes an upper cover, an intermediate cover and a lower cover which jointly form a receiving space within which electrical parts are received (see, for example, JP-A-11-027829 (Page 3, FIG. 2)).

As shown in FIG. 9, the electric distribution box 100, disclosed in JP-A-11-027829, includes the upper cover 101, the intermediate cover 102 and the lower cover 103 (each of which is made of a synthetic resin) which jointly form a box-like connection box within which a wiring board 104, a bus bar circuit board 105, a printed circuit board 106, connectors 107 and 108, a fuse mounting portion 109 and a relay mounting portion 110 are received.

The wiring board 104 includes an insulating board, and a plurality of wires 111 are installed on this insulating board, and are connected to press-contacting portions formed respectively at one ends of L-shaped terminals 112. Tab-like contact portions, formed respectively at the other ends of the L-shaped terminals 112, project into the interior of a connector housing to form the connector 107.

The bus bar circuit 105 includes an insulating board on which a plurality of bus bars 113 are installed, and terminal portions of the bus bars 113 are disposed within the fuse mounting portion 109. The printed circuit board 106 includes an insulating board having printed circuits of predetermined shapes formed thereon. The printed circuit board 106 and the wiring board 104 are connected together by long terminals 114. L-shaped terminals 115, connected to the printed circuit board 106, project into the interior of the connector 108. The connectors 107 and 108 and the fuse mounting portion 109 project outwardly from the intermediate cover 102. The printed circuit board 106 is fixed to the intermediate cover 102 and the lower cover 103 by a mounting plate 116 and screws 117.

In the electric distribution box described in JP-A-11-027829, however, the various component parts, including the wiring board 104, the circuit boards 105 and 106, the connectors 107 and 108, the fuse mounting portion 109 and the relay mounting portion 110, are received within the receiving space formed by the covers 101, 102 and 103. Therefore, there has been encountered a problem that a dead space is liable to be formed within the receiving space formed by the covers, so that the size of the electric distribution box increases, and also there has been encountered another problem that it is difficult to connect circuits at a high density.

Cumbersome joining technique (such as soldering) is required for electrically connecting the circuit boards 105 and 106, the connectors 107 and 108, the fuse mounting portion 109, the relay mounting portion 110 and so on to one anther so as to form circuits, and this has invited a problem that the time and labor required for the assembling operation, as well as the cost of the assembling operation, can not be reduced.

SUMMARY OF THE INVENTION

This invention has been made in view of the above circumstances, and an object of the invention is to provide an electric distribution box in which a compact design thereof can be achieved, and besides the time and labor, required for an assembling operation, can be reduced and a method of assembling the electric distribution box.

1) An electric distribution box of the present invention is characterized in that the electric distribution box includes a printed circuit board having a distribution installation circuit formed thereon, a power bus bar, a fuse holder in which a plurality of fuse holder connection terminals, connected to the printed circuit board, are press-fitted, and a connector block in which a plurality of connector block connection terminals, connected to the printed circuit board, are press-fitted, the connector block having a connector insertion portion; and the fuse holder, the connector block, the printed circuit board and the power bus bar are fixed to one anther to form a box.

In the invention of the above Paragraph 1), the fuse holder and the connector block are mounted on an outer peripheral edge portion of the printed circuit board, and the power bus bar is fixed to that portion of the printed circuit board lying between the fuse holder and the connector block, so that the fuse holder, the connector block and the power bus bar are disposed generally on a common plane. Therefore, the height of the electric distribution box can be reduced, thereby achieving a compact design thereof, and besides the time and labor, required for the assembling operation, can be reduced.

2) The electric distribution box of the above Paragraph 1) is further characterized in that a plurality of relays are fitted in the power bus bar.

In the invention of the above Paragraph 2), the plurality of relays are fitted in the power bus bar, and therefore heat, generated by an arc developing between contacts upon operation of each relay, is less liable to be transmitted to the printed circuit board. As a result, a failure due to heat can be avoided, so that the quality can be enhanced.

3) The electric distribution box of the above Paragraph 2) is further characterized in that the relays am disposed between the power bus bar and the printed circuit board.

In the invention of the above Paragraph 3), the relays are fixed to that portion of the printed circuit board lying between the fuse holder and the connector block, and with this arrangement the relays can be disposed generally on the plane in which the fuse holder and the connector block are disposed. And besides, a bent portion, forming a circuit for a controller mounted near to the power bus bar, can be easily formed. As a result, the overall structure, including the relays, can be made compact, and besides the circuit for the controller can be formed at the shortest distance.

4) The electric distribution box of the above Paragraph 2) is further characterized in that before the relays are fitted in the power bus bar, the power bus bar is divided into a plurality of bus bars by cutting.

In the invention of the above Paragraph 4), the power bus bar is formed into an integral construction by insert molding, and thereafter interconnecting portions are cut off, thereby providing the separate distribution bus bars required for forming the circuits. Therefore, the general-purpose ability can be enhanced.

The electric distribution box of the present invention can solve the problems that its size increases, that it is difficult to connect the circuits at a high density and that the time and labor required for the assembling operation, as well as the cost of the assembling operation, can not be reduced since the joining technique such as soldering is required. Therefore, there are achieved advantages that the compact size can be achieved and that the time and labor for the assembling operation can be reduced.

According to the present invention, there is also provided an electric distribution box, comprising:

a printed circuit board that has a distribution installation circuit;

a fuse holder that has a plurality of first connection terminals for connecting the distribution installation circuit;

a connector block that has a plurality of second connection terminals for connecting the distribution installation circuit; and a power bus bar, wherein the fuse holder is attached to a first end portion of the printed circuit board;

wherein the connector block is attached to a second end portion of the printed circuit board; and wherein the power bus bar is attached to the printed circuit board so as to face an attached face of the print circuit board in which the fuse holder and the connector block are attached.

Preferably, the electric distribution box further comprises a relay attached to the power bus bar.

Preferably, the relay is disposed between the power bus bar and the printed circuit board so as not contact to the printed circuit board.

Preferably, the power bus bar is divided into a plurality of bus bars.

Preferably, the first end portion of the printed circuit board is arranged at an opposite side of the second end portion of the printed circuit board.

According to the present invention, there is also provided a method of assembling an electric distribution box, comprising:

providing a printed circuit board that has a distribution installation circuit;

providing a fuse holder that has a plurality of first connection terminals for connecting the distribution installation circuit;

providing a connector block that has a plurality of second connection terminals for connecting the distribution installation circuit;

providing a power bus bar, attaching the fuse holder to a first end portion of the printed circuit board;

attaching the connector block to a second end portion of the printed circuit board; and attaching the power bus bar to the printed circuit board so as to face an attached face of the print circuit board in which the fuse holder and the connector block are attached.

Preferably, the method further comprises a process of attaching a relay to the power bus bar.

Preferably, the relay is disposed between the power bus bar and the printed circuit board so as not contact to the printed circuit board.

Preferably, the power bus bar is divided into a plurality of bus bars by cutting before the relay is attached to the power bus bar.

Preferably, the first end portion of the printed circuit board is arranged at an opposite side of the second end portion of the printed circuit board.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

A preferred embodiment of the present invention will now be described in detail with reference to the drawings.

Figure 1:
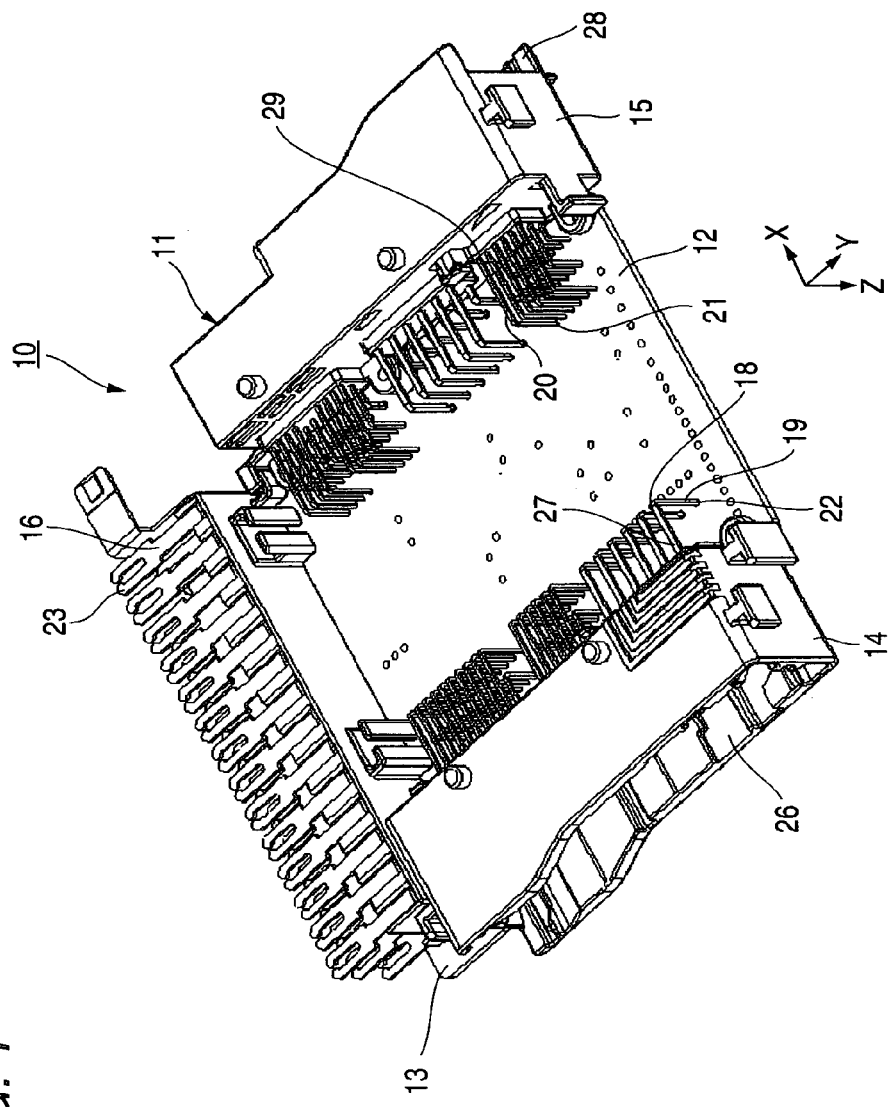
FIG. 1 is a perspective view of a first assembly used in one preferred embodiment of an electric distribution box of the present invention.
Figure 2:
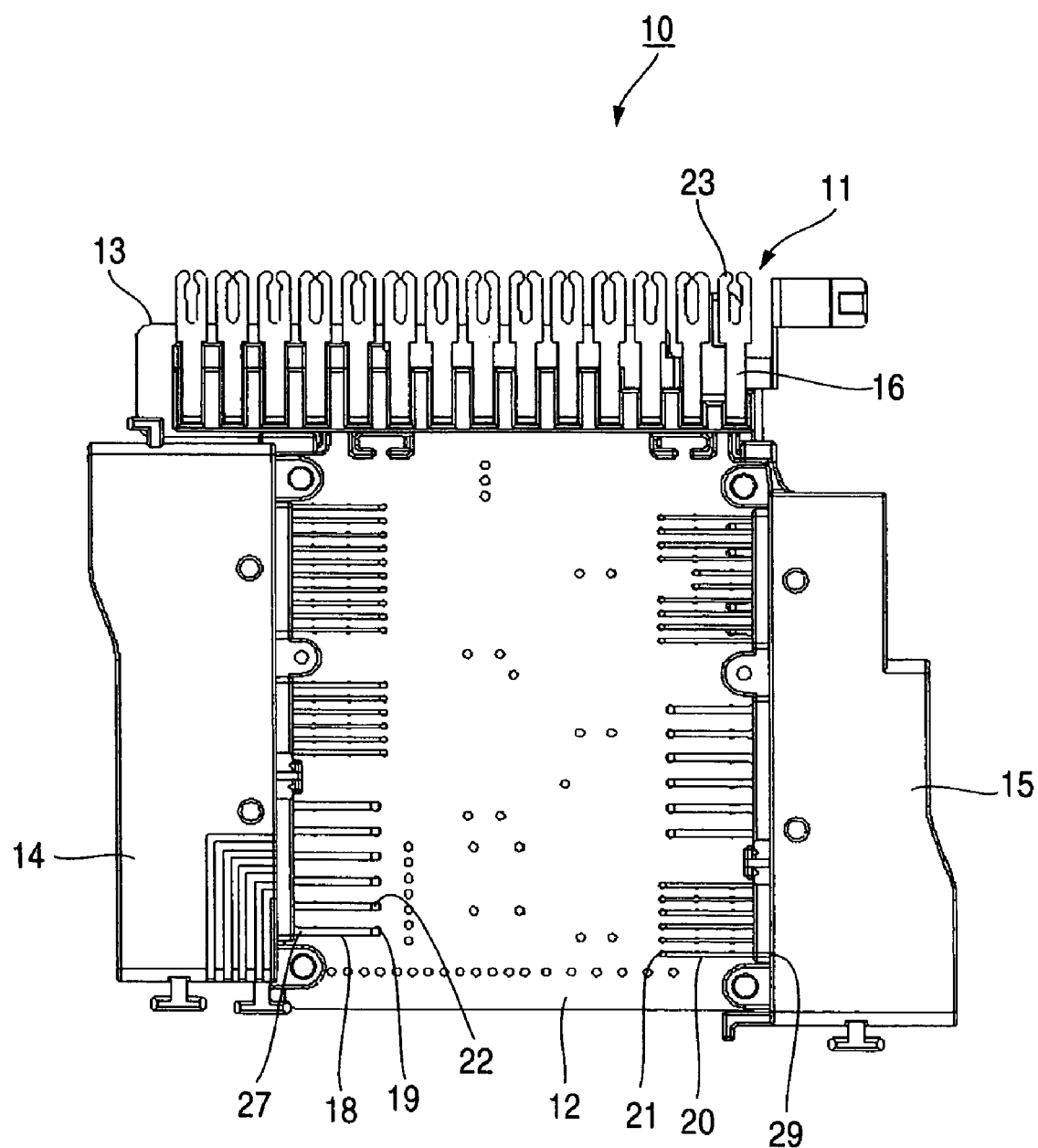
FIG. 2 is a plan view of the first assembly of FIG. 1.
Figure 3:
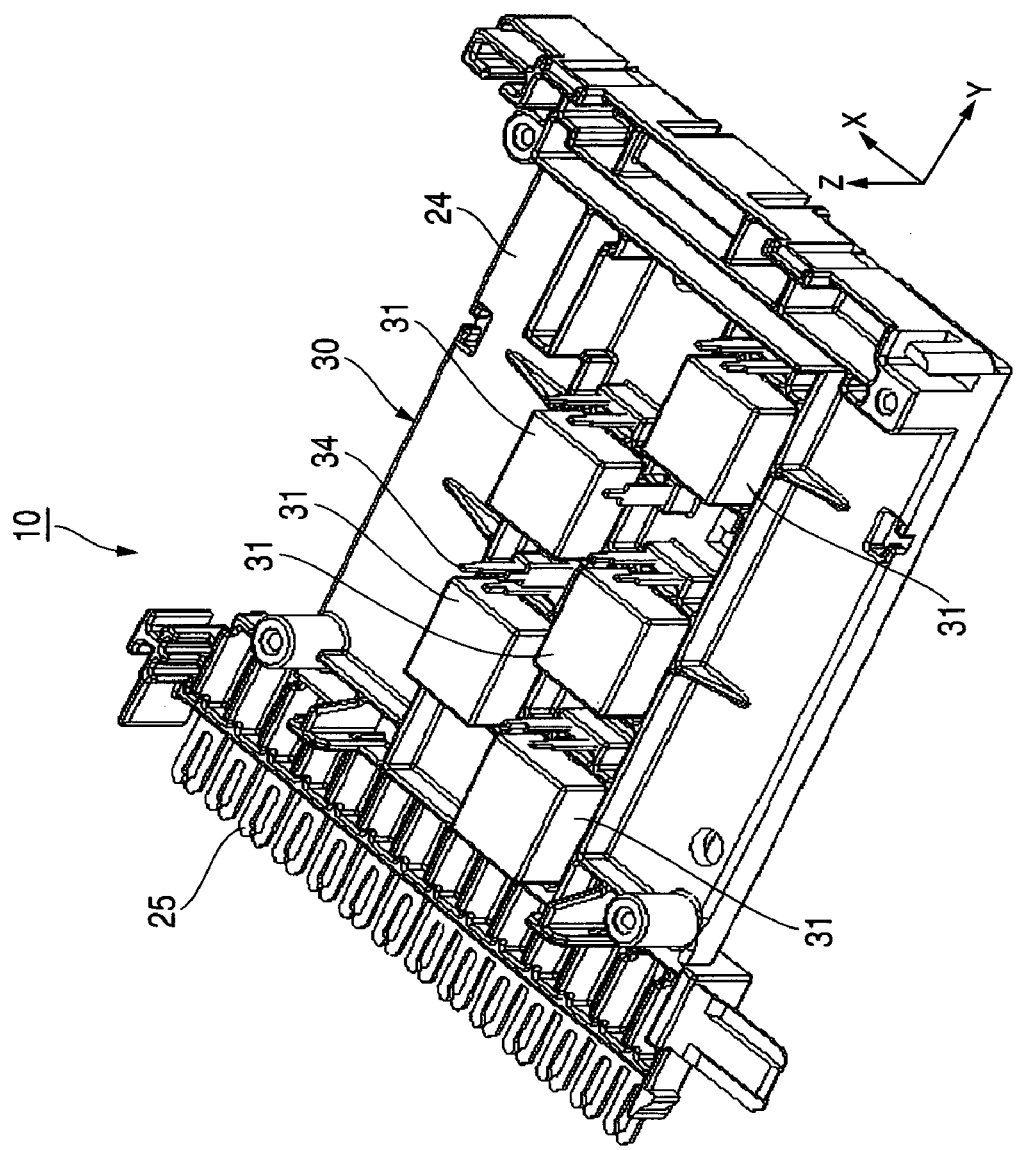
FIG. 3 is a perspective view of a second assembly of the electric distribution box of the invention.
Figure 4:
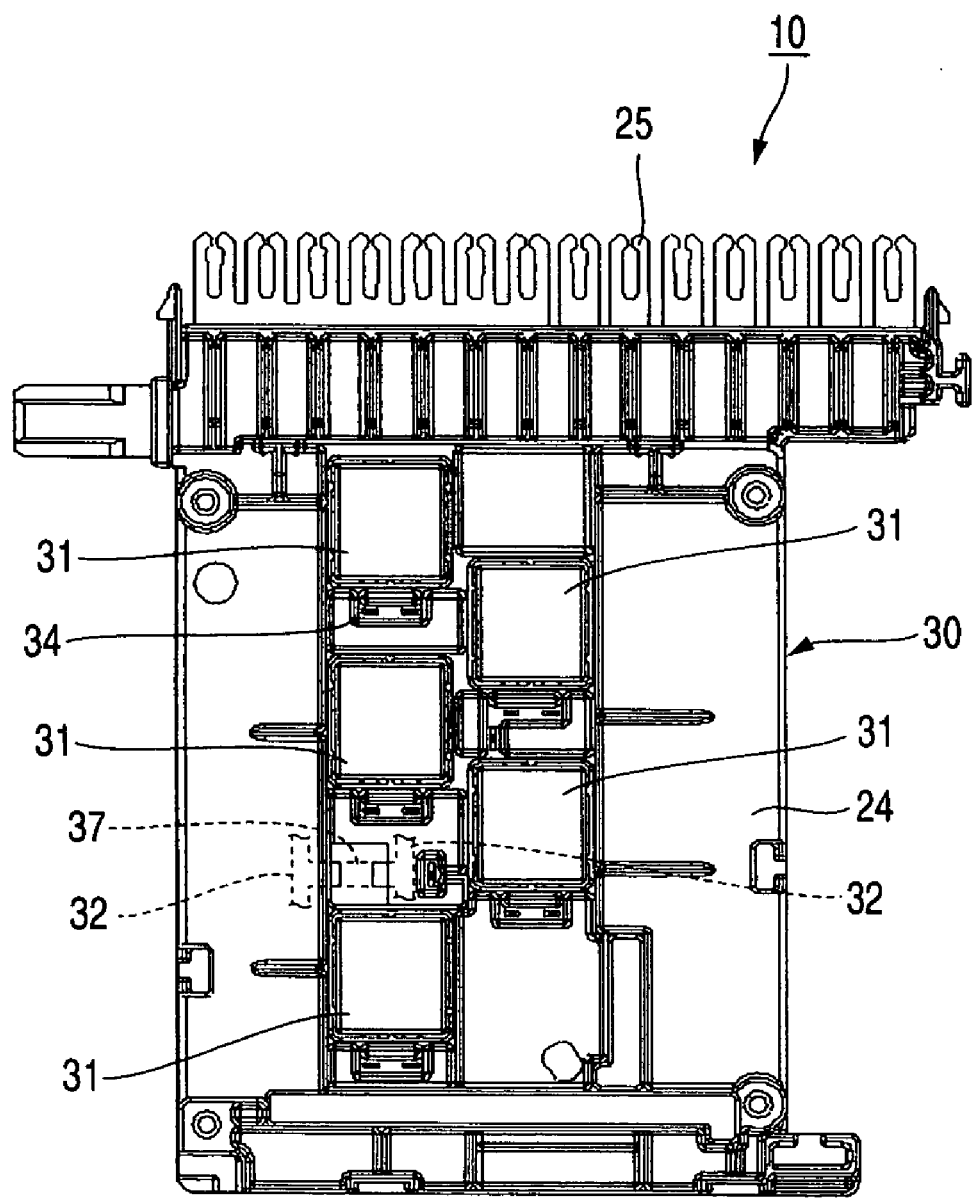
FIG. 4 is a plan view of the second assembly of FIG. 3.
Figure 5:
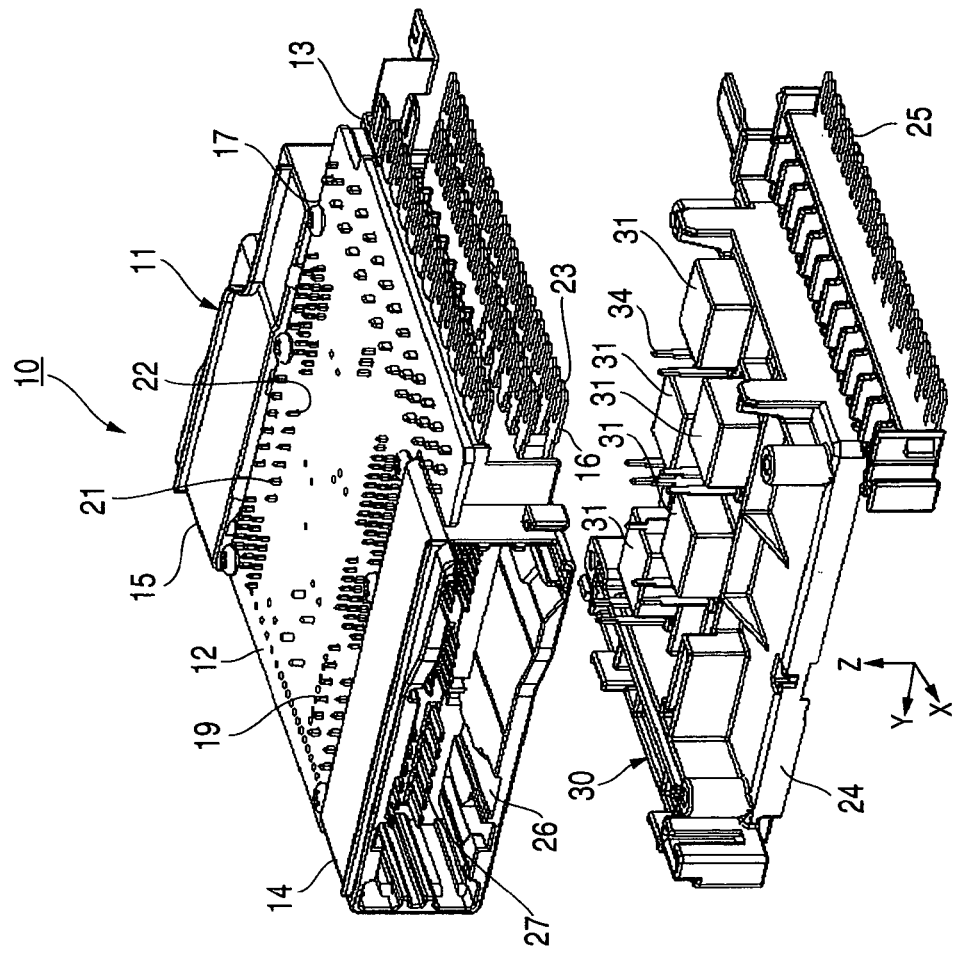
FIG. 5 is a perspective view explaining the manner of assembling the first and second assemblies together.
Figure 6:
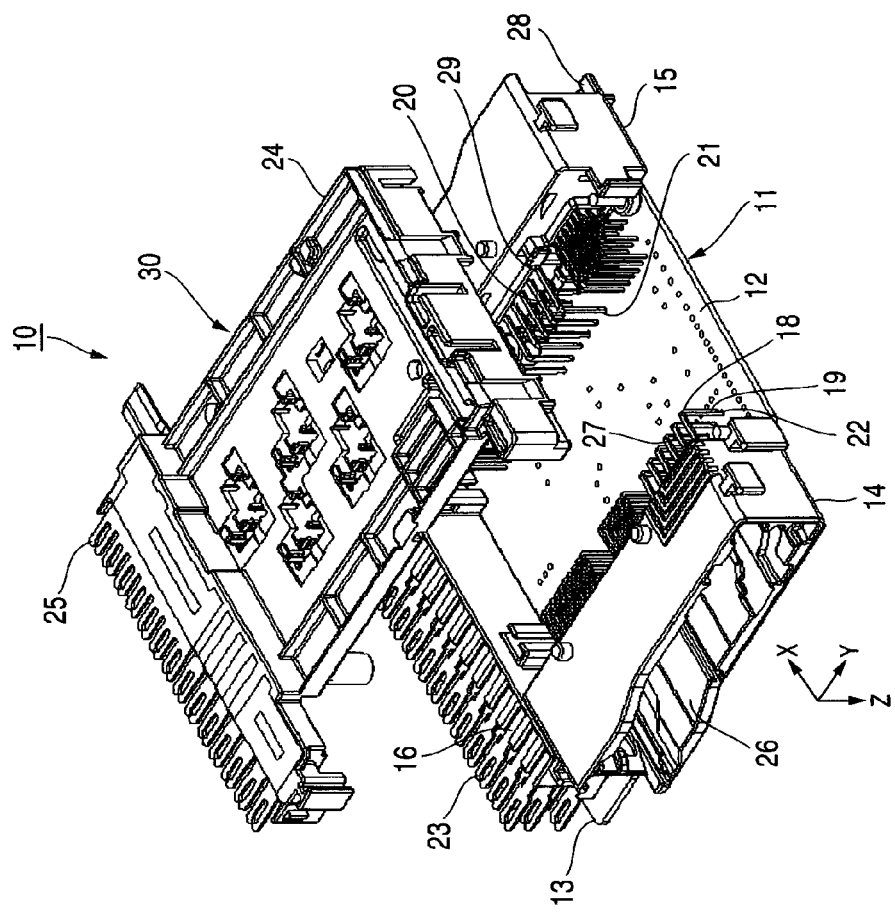
FIG. 6 is a perspective view of the electric distribution box as seen from the lower side of FIG. 5.
Figure 7:
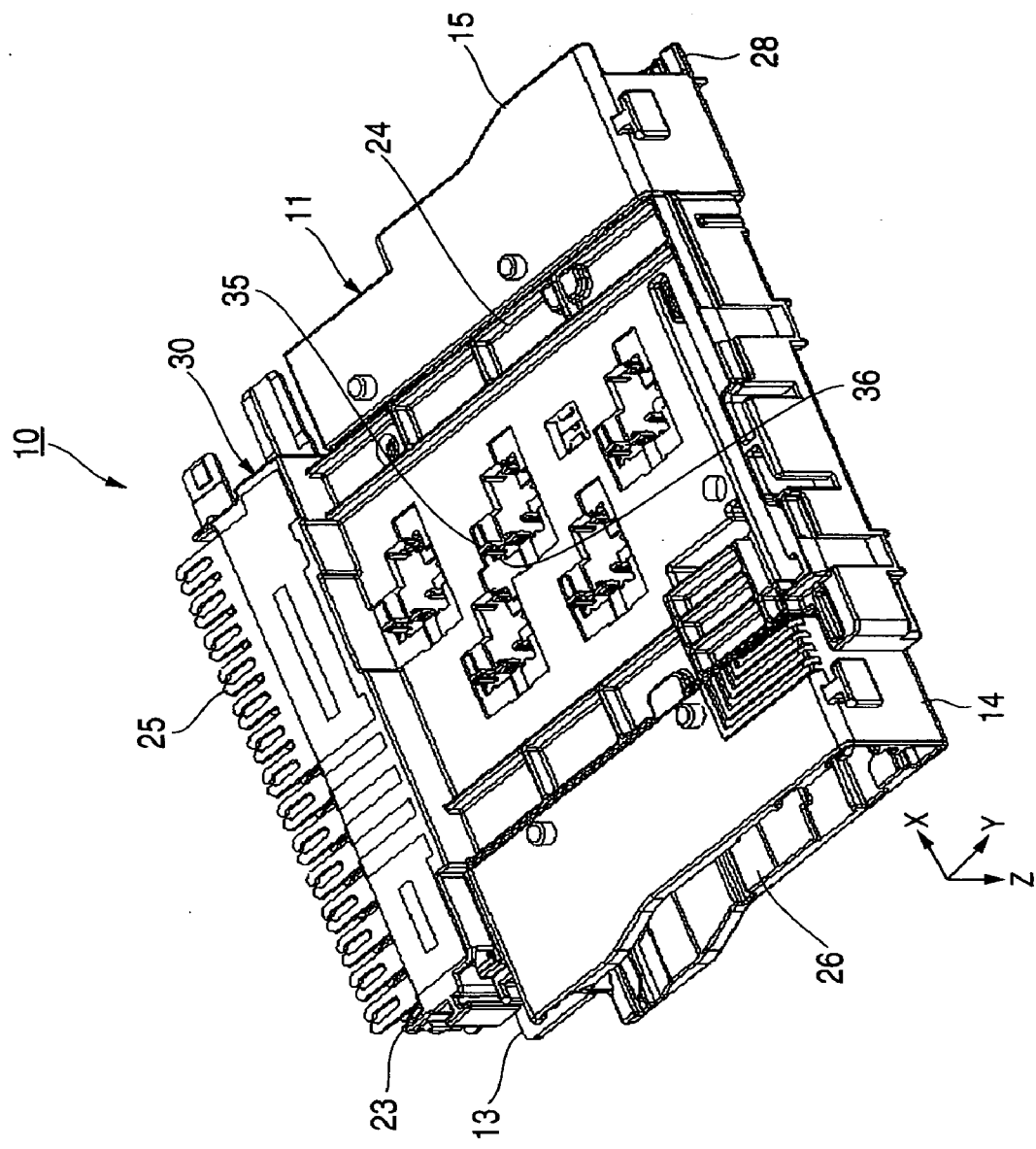
FIG. 7 is a perspective view of the electric distribution box of FIG. 6 in its assembled condition.
Figure 8:
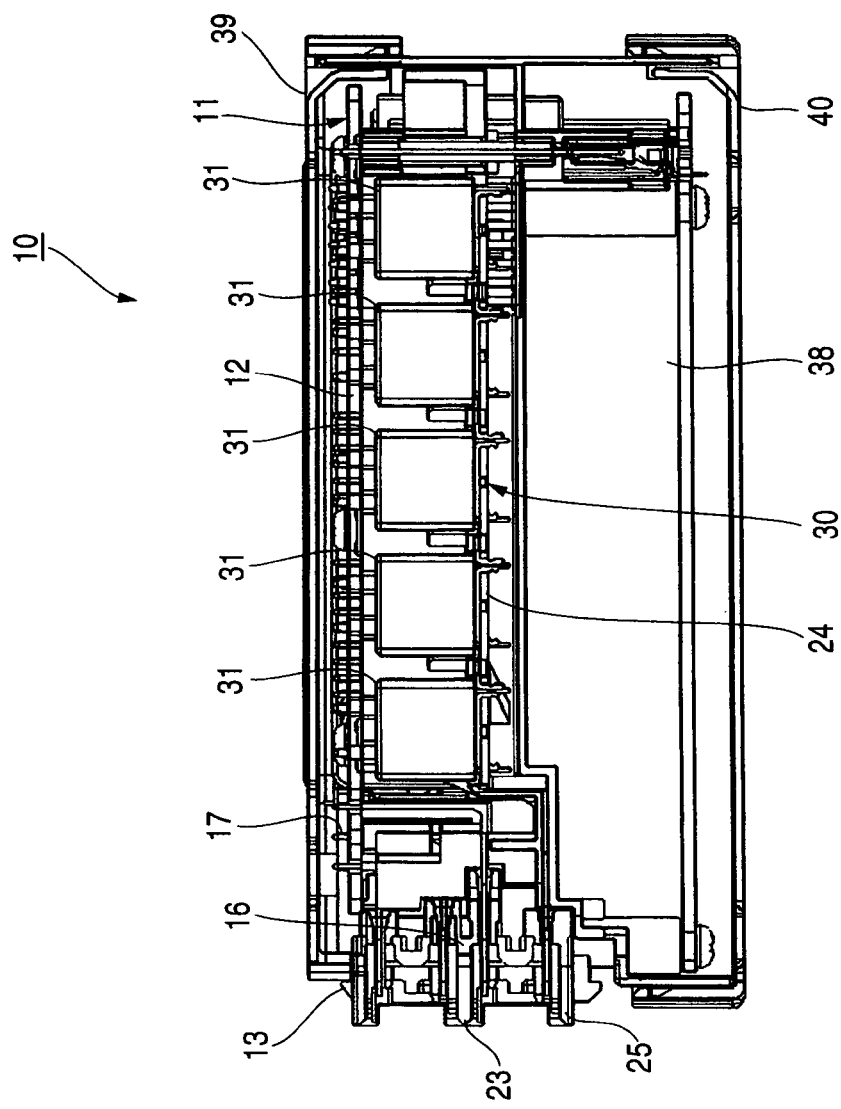
FIG. 8 is a cross-sectional view of the electric distribution box of FIG. 7.
Figure 9:
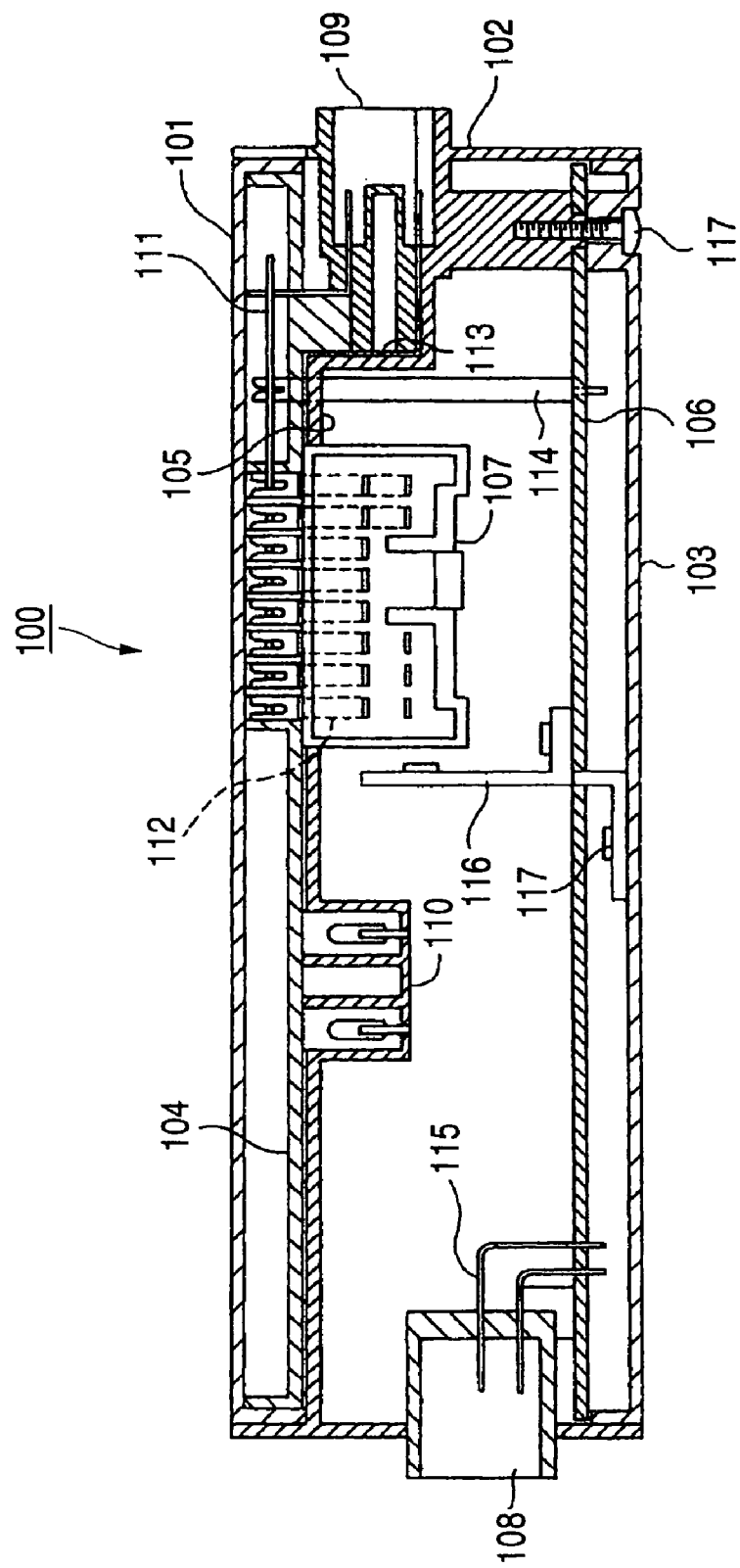
FIG. 9 is a cross-sectional view of a related electric distribution box.

FIG. 1 is a perspective view of a first assembly used in one preferred embodiment of an electric distribution box of the present invention, FIG. 2 is a plan view of the first assembly of FIG. 1, FIG. 3 is a perspective view of a second assembly of the electric distribution box of the invention, FIG. 4 is a plan view of the second assembly of FIG. 3, FIG. 5 is a perspective view explaining the manner of assembling the first and second assemblies together, FIG. 6 is a perspective view of the electric distribution box as seen from the lower side of FIG. 5, FIG. 7 is a perspective view of the electric distribution box of FIG. 6 in its assembled condition, and FIG. 8 is a cross-sectional view of the electric distribution box of FIG. 7.

As shown in FIG. 1, the first assembly 11 of the preferred embodiment of the electric distribution box 10 of the invention includes a printed circuit board 12, a fuse holder 13, a first connector block 14, and a second connector block 15 which are assembled together. With respect to coordinates X, Y, Z in the drawings, X denotes a horizontal direction, Y denotes a forward direction, and Z denotes a vertical direction.

The printed circuit board 11 has a plurality of connection holes 22. Board connection portions 17 (see FIG. 5) formed respectively at one ends of a plurality of fuse holder connection terminals 16 (provided at the fuse holder 13), board connection portions 19 formed respectively at one ends of a plurality of connector block connection terminals 18 (provided at the first connector block 14), and board connection portions 21 formed respectively at one ends of a plurality of connector block connection terminals 20 (which are provided at the second connector block 15) are inserted respectively in the corresponding connection holes 22 so as to be electrically connected to a distribution installation circuit (not shown).

The fuse holder 13 is mounted on an end edge portion (directed in a direction opposite to the direction Y in FIG. 1) of the printed circuit board 12. The fuse holder connection terminals 16, provided at the fuse holder 13, have bifurcated fuse mounting portions 23 formed respectively at the other ends thereof (projecting in the direction opposite to the direction Y (in FIG. 1)) and arranged in three rows in the upward-downward direction, each row having fourteen (14)

fuse holder connection terminals 16. A plurality of auto-fuses (not shown) are electrically connected to the upper two rows (lower two rows in FIG. 1) of fuse holder connection terminals 16. The lowermost row (uppermost row in FIG. 1) of fuse holder connection terminals 16 (that is, the fuse mounting portions 23) are opposed respectively to a row of (fourteen) fuse mounting portions 25 (provided at a power bus bar 24 described later) in the upward-downward direction, and a plurality of auto-fuses (not shown) are electrically connected to these opposed fuse mounting portions 23 and 25.

The first connector block 14 has a connector insertion portion 26 in the form of a generally rectangular hole, and is mounted on an end edge portion of the printed circuit board 12 directed in a direction opposite to the direction X (in FIG. 1). Each of the connector block connection terminals 18, provided at the first connector block 14, is an L-shaped terminal, and includes the board connection portion 19 extending in the direction Z (in FIG. 1), and an external connection portion 27 extending in the direction opposite to the direction X (in FIG. 1). The external connection portions 27 project into the connector insertion portion 26, and are arranged in a predetermined pattern.

The second connector block 15 has a connector insertion portion 28 in the form of a generally rectangular hole, and is mounted on an end edge portion of the printed circuit board 12 directed in the direction X (in FIG. 1). Like the connector block connection terminals 18 of the first connector block 14, each of the connector block connection terminals 20, provided at the second connector block 15, is an L-shaped terminal, and includes the board connection portion 21 extending in the direction Z (in FIG. 1), and an external connection portion 29 extending in the direction X (in FIG. 1). The external connection portions 29 project into the connector insertion portion 28, and are arranged in a predetermined pattern.

As shown in FIG. 2, the fuse holder 13 is mounted on an upper side portion of the printed circuit board 12, and the first and second connector blocks 14 and 15 are mounted respectively on opposite side portions of the printed circuit board 12. Therefore, the fuse holder 13 and the first and second connector blocks 14 and 14 are disposed on a common plane in such a manner that the printed circuit board 12 is disposed at a central portion of the first assembly 11. As a result, a space portion is formed on the printed circuit board 12.

Next, a procedure of assembling the above first assembly 11 will be described.

First, the lowermost row of fuse holder connection terminals 16 (in FIG. 1) are press-fitted into the fuse holder 13, and then the central row of fuse holder connection terminals 16 (in FIG. 1) are press-fitted into the fuse holder 13, and then the uppermost row of fuse holder connection terminals 16 (in FIG. 1) are press-fitted into the fuse holder 13. In this manner, the fuse holder 13, having the three rows of fuse holder connection terminals 16, is produced.

Then, the fuse holder 13 is mounted on the end edge portion of the printed circuit board 12, and the board connection portions 17 are inserted respectively into the predetermined connection holes 22 disposed near to the end edge of the printed circuit board 12, and are electrically connected to the distribution installation circuit at the front surface of the printed circuit board 12.

Then, the first and second connector blocks 14 and 15 are mounted respectively on the opposite side edge portions of the printed circuit board 12, and the board connection portions 19 are inserted respectively into the predetermined connection holes 22 disposed near to the side edge of the printed circuit board 12, while the board connection portions 21 are inserted respectively into the predetermined connection holes 22 disposed near to the other side edge of the printed circuit board 12. As a result, the board connection portions 19 and 21 are electrically connected to the distribution installation circuit at the front surface of the printed circuit board 12. Thus, the assembling of the first assembly 11 is completed.

The second assembly 30 of the electric distribution box 10 of the invention includes the power bus bar 24, and a plurality of (five) relays 31.

The power bus bar 24 has a plurality of plate-like bus bars 32 (see FIG. 4) integrally insert-molded in its body, and has the fourteen (14) fuse mounting portions 25 extending in a direction opposite to the direction Y (in FIG. 3). Five relay fixing portions 33 (in which the relays 31 can be fitted, respectively) are formed on a central portion of the power bus bar 24, and are arranged in two rows. The power bus bar 24 has a plurality of board connection portions 34 extending in the direction Z (in FIG. 3), and the board connection portions 34 are disposed between the adjacent relay fixing portions 33.

As shown in FIG. 4, the power bus bar 24 has relay connection portions 36 (see FIG. 6), and when the relays 31 are inserted respectively into the relay fixing portions 33, the relay connection portions 36 are electrically connected to connection terminals 35 (see FIG. 6) provided at the relays 31. Here, after the plurality of bus bars 32 are insert-molded in the power bus bar 24, interconnecting portions 37 are cut off at predetermined positions, so that the bus bars 32, required for forming circuits, are electrically isolated from each other to form the relay connection portions 36.

Next, a procedure of assembling the above second assembly 30 will be described.

The plurality of bus bars 32 are subjected to a cutting operation and a bending operation, and the power bus bar 24 is molded. At this time, the interconnecting portions 37 are not yet cut off, and the plurality of bus bars 32 are integrally interconnected.

Then, the integrally-interconnected bus bars 32 is integrally insert-molded in a resin, and after this molding operation, the interconnecting portions 37 are cut off at the predetermined positions.

As a result of the cutting-off of the interconnecting portions 37, the bus bars (distribution bus bars) 32 form the circuits electrically isolated from each other. Then, the relays 31 are fitted respectively into the relay fixing portions 33, and the connection terminals 35 of the relays 31 are electrically connected to the bus bars 32.

Next, a procedure of assembling the electric distribution box 10, using the first and second assemblies 11 and 30, will be described with reference to FIGS. 5, 6 and 7.

As shown in FIG. 5, the first assembly 11 is located above the second assembly 30. At this time, the second assembly 30 is so disposed that the fuse mounting portions 25 of the power bus bar 24 are directed in the direction opposite to the direction Y (in FIG. 5), and the first assembly 11 is so disposed that the fuse mounting portions 23 of the fuse holder 13 are directed in the same direction of extending of the fuse mounting portions 25 of the fuse holder 13 (that is, in the direction opposite to the direction Y (in FIG. 5)).

As shown in FIG. 6 in which the electric distribution box of FIG. 5 is inverted, the second assembly 30 is combined with the first assembly 11 in such a manner that the relays 31 are disposed in the space portion (lying between the first and second connector blocks 14 and 15) on the printed circuit board 12, and the first and second assemblies 11 and 30 are assembled together in a unitary manner.

When the first and second assemblies 11 and 30 are thus assembled together in a unitary manner, the fuse mounting portions 25 of the power bus bar 24, the first and second connector blocks 14 and 15 and the relays 31 are disposed generally on a common plane as shown in FIG. 7.

In the electric distribution box 10 thus assembled by combining the first and second assemblies 11 and 30 together, the relays 31 are disposed beneath the printed circuit board 12 in spaced relation thereto (that is, the relays 31 are disposed out of contact with the printed circuit board 12), and the fuse mounting portions 23 and 25 are disposed at the sides of the power bus bar 24 (on which the relays 31 are mounted in a fitted manner) and printed circuit board 12, as shown in FIG. 8. A controller 38 is mounted beneath the power bus bar 24. Therefore, the power bus bar 24 and the controller 38 are disposed in proximity to each other, and therefore a bent portion (not shown), forming a circuit for the controller 38, can be easily formed, and an energizing circuit from the power bus bar 24 to the controller 38 can be formed at the shortest distance. An outer cover 39 is attached to cover the printed circuit board 12, and a controller cover 40 is attached to cover the controller 38.

In the above electric distribution box 10, the fuse holder 13 and the first and second connector blocks 14 and 15 are mounted on the outer peripheral edge portion of the printed circuit board 12, and the power bus bar 24 is fixed to that portion of the printed circuit board 12 generally surrounded by the fuse holder 13 and the first and second connector blocks 14 and 15, so that the fuse holder 13, the first and second connector blocks 14 and 15 and the power bus bar 24 are disposed generally on a common plane. And besides, the fuse holder connection terminals 16 of the fuse holder 13 and the connector block connection terminals 18 and 20 of the first and second connector blocks 14 and 15 can easily be electrically connected to the distribution installation circuit of the printed circuit board 12 without using any joining technique such as soldering. The height of the electric distribution box can be reduced, thereby achieving the compact design thereof, and besides the time and labor, required for the assembling operation, can be reduced.

Furthermore, in the electric distribution box 10, the plurality of relays 31 are fitted in the power bus bar 24, and therefore heat, generated by an arc developing between contacts upon operation of each relay 31, is less liable to be transmitted to the printed circuit board 12. As a result, a failure due to heat can be avoided, so that the quality can be enhanced.

Furthermore, in the electric distribution box 10, the relays 31 are arranged that portion above the printed circuit board 12 generally surrounded by the fuse holder 13 and the first and second connector blocks 14 and 15, and with this arrangement the relays 31 can be disposed generally on the plane in which the fuse holder 13 and the first and second connector blocks 14 and 15 are disposed. And besides, the bent portion, forming the circuit for the controller 38 mounted near to the power bus bar 24, can be easily formed. As a result, the overall structure, including the relays 31, can be made compact, and besides the circuit for the controller 38 can be formed at the shortest distance.

In the electric distribution box 10, the power bus bar 24 is formed into the integral construction by insert molding, and thereafter the interconnecting portions 37 are cut off, thereby providing the separate distribution bus bars 32 required for forming the circuits. Therefore, the general-purpose ability can be is enhanced.

The present invention is not limited to the above embodiment, and suitable modifications, improvements and so on can be made. For example, the number of the fuse holder connection terminals, the number of the connector block connection terminals and the number of the bus bars are suitably determined according to the number of circuits provided in a vehicle on which the electric distribution box is to be mounted.

The present application is based on Japan Patent Application No. 2004-374723 filed on Dec. 24, 2004, the contents of which are incorporated herein for reference.

What is claimed is:

1. An electric distribution box, comprising:
   a printed circuit board that has a distribution installation circuit;
   a fuse holder that has a plurality of first connection terminals for connecting the distribution installation circuit;
   a connector block that has a plurality of second connection terminals for connecting the distribution installation circuit; and
   a power bus bar,
   wherein the fuse holder is attached along a side edge of a first end portion of the printed circuit board, so as to extend along the first end portion;
   wherein the connector block is attached along a side edge of a second end portion of the printed circuit board; and
   wherein the power bus bar is attached to the printed circuit board so as to face an attached face of the print circuit board, wherein the fuse holder and the connector block are both attached to the same attached face.

2. The electric distribution box according to claim 1, further comprising a relay attached to the power bus bar.

3. The electric distribution box according to claim 2, wherein the relay is disposed between the power bus bar and the printed circuit board so as not contact to the printed circuit board.

4. The electric distribution box according to claim 2, wherein the power bus bar is divided into a plurality of bus bars.

5. A method of assembling an electric distribution box, comprising: providing a printed circuit board that has a distribution installation circuit;
   providing a fuse holder that has a plurality of first connection terminals for connecting the distribution installation circuit;
   providing a connector block that has a plurality of second connection terminals for connecting the distribution installation circuit;
   providing a power bus bar,
   attaching the fuse holder along a side edge of a first end portion of the printed circuit board, so as to extend along the first end portion;
   attaching the connector block along a side edge of a second end portion of the printed circuit board; and
   attaching the power bus bar to the printed circuit board so as to face an attached face of the print circuit board, wherein the fuse holder and the connector block are both attached to the same attached face.

6. The method according to claim 5, further comprising: attaching a relay to the power bus bar.

7. The electric distribution box according to claim 6, wherein the relay is
   disposed between the power bus bar and the printed circuit board so as not contact to the printed circuit board.

8. The method according to claim 6, wherein the power bus bar is divided into a plurality of bus bars by cutting before the relay is attached to the power bus bar.

* * * * *